3,482,929
METHOD AND APPARATUS FOR EVAPORATING VOLATILE SOLUTIONS OF AIR TREATMENT SUBSTANCES
Albert Gentil, 19 Rue de la Varenne, Saint-Maur-des-Fosses, Val-de-Marne, France
Filed Mar. 22, 1965, Ser. No. 441,593
Claims priority, application France, Mar. 28, 1964, 969,137
Int. Cl. A61l 9/02; A61k 7/00
U.S. Cl. 21—53                                                4 Claims

ABSTRACT OF THE DISCLOSURE

Means for evaporating without decomposition liquid volatile substances or solutions or mixtures of such substances such as perfumes, antiseptics, insecticides and the like. The substance is introduced into a container to a certain level and the container is inverted and disposed upon and in contact with the surface of a porous material in the form of a bed and fed to such impregnated porous material in proportion to its evaporation. The rate of evaporation can be varied by providing a second layer of porous material in contact with the first mentioned layer, said second layer being selectively divided into plural portions so that the surface area may be varied. The rate of evaporation can be further varied by providing a heating element in close proximity to said second layer of porous material.

---

This invention relates to a method of evaporating volatile liquid substances as well as any solutions containing such substances, notably antiseptics, perfumes, insecticides or any other products of the same type, without causing their decomposition while permitting a regular, permanent gaseous emission, or according to a predetermined cycle, of said substances or solution, without requiring any handling thereof.

Regarding perfumes, it was current practice up to now to evaporate them by exposure in a container to the surrounding or heated air. To ensure an efficient evaporation the surface contacting the air must be relatively important. According to atmospheric conditions, the evaporation is more or less rapid; since the whole liquid contacts the air, it must be renewed at a frequent trate due to alterations likely to take place, such as oxidation, polymerization, etc.

If the container filled with an aqueous perfume solution is heated, the extremely volatile perfume will frequently be released before the water of the perfumed solution. Initially, the emission of perfume is very strong and then decreases rapidly. On the other hand, it is known that when a perfume is heated it decomposes for the reasons set forth hereinabove.

The method of this invention eliminates all these drawbacks.

The method according to this invention consists essentially in that the capacity containing the liquid to be evaporated is so arranged as to feed the liquid to a surface consisting of a porous material, the supply of liquid for impregnating the porous material taking place as the liquid evaporates from the surface of said material.

According to another feature characterizing this invention, the surface of the liquid-impregnated porous material is caused to vary as a function of the desired evaporation rate. To the same end any known means may be used for heating directly or indirectly said porous material without any risk of causing this heating action to deteriorate the liquid contained in said capacity.

Figure 1:
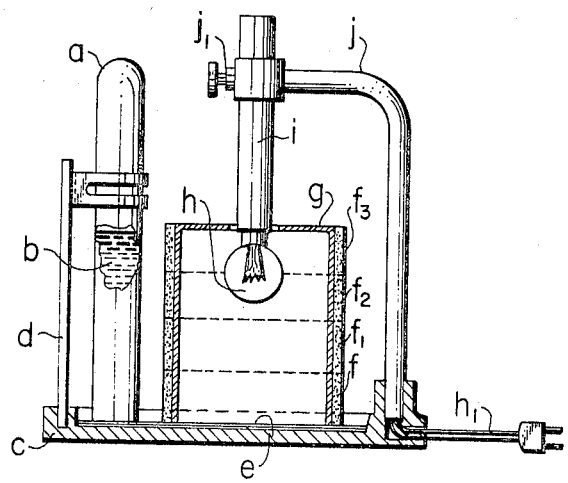
Figure 2:
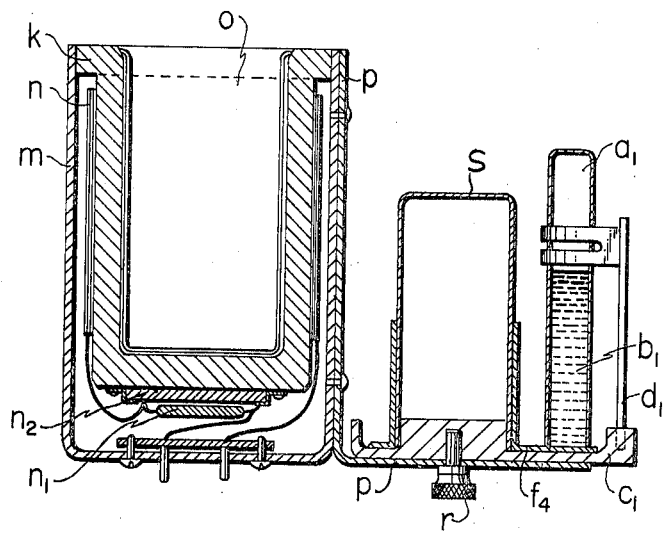

The method according to the present invention may advantageously be carried out by means of apparatus of the type illustrated by way of example in FIGURES 1 and 2 of the attached drawings showing in side elevational and sectional view two different forms of embodiment of these apparatus.

The apparatus illustrated in FIGURE 1 of the drawing comprises a tube $a$ filled up to a certain level only with the solution or substance $b$ to be evaporated. This inverted tube has its open end disposed adjacent the bottom of a tray $c$ on which the support $d$ of tube $a$ is secured, as shown. The bottom of this tray $c$ is lined with a layer of porous material $e$ consisting for example of felt, absorbent paper, etc., engaged by the edge of tube $a$ so that the substance or solution $b$ contained therein may flow by capillarity therefrom, so as to impregnate the porous material with this substance or solution. The porous material $e$ contacts another layer of porous material which may differ or be the same as the first layer and consist of rings $f$, $f_1$, $f_2$ and $f_3$ fitted on the outer surface of a cylinder $g$ made from a conducting metal. This cylinder is heated by an electrical bulb $h$ mounted in a lampholder $i$ carried in turn by a bracket $j$ secured on the tray $c$, a conductor $h_1$ for supplying current to the bulb $h$ passing through this bracket $j$. The lampholder $i$ is vertically adjustable by means of a set screw $j_1$.

The above described apparatus operates as follows:

The liquid surface impregnating the porous material $e$ and $f \ldots f_3$ as well as the liquid ring formed by capillarity around the lower edge of tube $a$ supports the atmospheric pressure counterbalancing the pressure acting upon the liquid surface in the free space at the upper portion of tube $a$.

The external air penetrates into the tube $a$ to compensate the liquid flow by restoring the pressure balance. The porous material is thus fed as the liquid layer of the capillary ring evaporates. Under these conditions a regular evaporation is obtained and the liquid is heated only during a relatively short time period, thus avoiding any deterioration, transformation or decomposition. The practically unaltered products are thus diffused in the surrounding atmosphere while preserving all their initial properties. The thin-layer evaporation is rapid and permits a simultaneous emission of all the constituents in spite of their different volatilities; the concentration of the less volatile product in the reduced thickness of porous material being relatively moderate. Under these conditions the product is utilized to complete exhaustion without undergoing any alteration or modification.

Besides, the heat is not transmitted to the tube supplying the liquid to the porous material. In fact, the passage of a subsance from the liquid state to the gaseous state is attended by an absorption of heat and the change of state will cool the liquid at the bottom of the duct feeding the evaporaor.

It may be noted that the rate of evaporation of the solution may be varied according to any desired degree by varying the evaporation surface area of the porous material. To this end, with the superposed ring arrangement $f \ldots f_3$ of the porous material, it is possible to achieve this result by simply either removing one or several rings, or disposing therebetween an intetrmediate ring of any non-conducting material, or still providing between these rings a free space sufficient to discontinue the supply of liquid by capillarity to the porous material.

The heating may be obtained through any one of a variety of known means, such as a resistor coupled with a thermostat, by contact with the assistance of a conducting metal, or any adequate source of heat, by radiation, convection, etc.

From the foregoing it is clear that with an apparatus of the type shown in FIGURE 1 products consisting of elements having a more or less pronounced volatility can be evaporated without deteriorating them. However, in the case of products which cannot be mixed, it is advantageous to evaporate different products simultaneously so that the desired gaseous mixture may be formed in the atmosphere. To this end an apparatus of the type illustrated in FIGURE 2 may be used with a view to produce a synergistic effect by evaporating odorifierous, bactericidal or insecticidal substances in conjunction with a sublimation of solid products or an evaporation of other liquids.

The apparatus shown in FIGURE 2 consists of a hollow block $k$ disposed in an enclosure $m$ open at its top. This block $k$ is heated by a resistor $n$ coupled with a capacitor $n_1$ and a thermostat $n_2$. The block $k$ has a cavity $o$ in which a container made from a heat conducting material is fitted, this container receiving the product to be sublimated or evaporated. The enclosure $m$ is connected through a connecting piece $p$ to an evaporator constructed according to the teachings of this invention and comprising a tube $a_1$ filled with the product $b_1$ and connected to the tray $c_1$ secured in turn by means of a screw $r$ to the connecting piece $p$. The tube $a_1$, according to the method of this invention, contacts a porous material $f_4$ fitting on a cylinder $s$ made from conducting material. The operation of this evaporator is the same as in the case of the apparatus shown in FIGURE 1.

The porous material may also occur in the form of rings as described in connection with the apparatus of FIGURE 1.

It may also consist of a sheet supported vertically by means of a bracket or a frame.

It will also be noted that the porous material for evaporating the product may be fed liquid by using any suitable and known devices such as a gauged dropper delivering the requisite amount of substance which is to be diffused in the atmosphere. This technique is also applicable to the simultaneous emission of products which cannot be mixed in the form of stocking solutions.

Any porous material may be used, notably filter paper or absorbent paper, wick, fabric, plastic foam, polyurethane, polyvinyl, sintered glass, capillary tube assemblies, etc.

From the foregoing it is clear that by using the apparatus of this invention different products can be evaporated simultaneously or not with the emission of aerosols by sublimation. The emission in aerosol form of a sublimable product such as hexylresorcinol, which requires a relatively high hygrometric degree for attaining its maximum bactericidal effect, may be improved considerably by resorting to the vaporization of a solution thereof.

The evaporation of solutions according to this invention makes it possible to utilize mixtures or dilutions of efficient products, such as insecticides, diluted in inert substances. The evaporation rate may be controlled by adjusting the temperature and/or the evaporation surface; thus, predetermined volumes of air can be treated without any risk of causing discomfort to the persons residing in the rooms.

The evaporation of solutions according to the teachings of this invention permits of utilizing for example alterable products such as dimethyl dichlorovinyl phosphate. As this substance is very sensitive to humidity it may be diluted for example with essential oils having hydrophobic properties capable of protecting it against alterations caused by its hydrolysis, and on the other hand it will be possible, by this dilution, of palliating the toxicity of this product, which may thus be evaporated at rates sufficiently controlled to enable it to produce its insecticidal action without constituting a danger, that is, without attaining in the surrounding atmosphere the maximum concentration tolerated by human beings.

The method and apparatus of this invention may be used for humidifying the atmosphere, which is a very considerable advantage over humidifiers of the type emitting mists by mechanical action, which lead to oversaturation.

In this specific application of the apparatus of the present invention the porous material may be supplied with water from a tank having several pipe lines ensuring a proper distribution of the water throughout the surface of the porous material. The hygrometric degree may be adjusted by using a hygrometer adapted either to discontinue the supply of current when the desired hygrometric degree is attained, or to stop the supply of water. The evaporated water may be perfumed but if the water and perfume mixture is not compatible perfumes may be emitted simultaneously with water vapor by using for example the apparatus shown in FIGURE 2.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A process of treating air by the evaporation of a liquid containing a mixture of a plurality of volatile substances with different volatility and constant capillarities such as perfumes, antiseptics, insecticides and the like without bringing about their decomposition, while permitting a uniform gaseous emission, comprising introducing said liquid into a container to a predetermined level, providing a horizontal layer of porous material in the form of a bed, inverting said container upon said bed of porous material in contact with said bed so that said liquid is fed from said container to said bed by capillary action thereby impregnating said porous material in said bed to supply said bed in proportion to the evaporation of said liquid from said bed, and evaporating the liquid into the air surrounding the porous bed.

2. A process as set forth in claim 1 comprising providing a second layer of porous material in contact with said first named layer, selectively dividing said second layer of porous material into a plurality of separate portions so that the area of the surface for evaporation from said second layer may be varied, and then heating said second layer at least for a short interval to assist evaporation.

3. An apparatus for evaporating liquid volatile substances comprising a container for the liquid to be evaporated, a pan having at the bottom thereof a first layer of porous material, means for flowing said liquid by capillary action upon said first layer, a heated receptacle spaced from said container in said pan, a plurality of rings of porous material forming a second layer located about said heated receptacle, said first layer of porous material being in contact with said second layer of porous material whereby the area of evaporation may be varied by changing the number of said rings.

4. An apparatus as set forth in claim 3 wherein said rings are detachable.

(References on following page)

References Cited

UNITED STATES PATENTS

| | | |
|---|---|---|
| 1,058,808 | 4/1913 | Thilges. |
| 1,230,342 | 6/1917 | Thornberg _____ 21—120 XR |
| 1,727,899 | 9/1929 | Odlum. |
| 1,732,674 | 10/1929 | Dever. |
| 2,152,466 | 6/1936 | Clyne. |
| 2,469,656 | 5/1949 | Lienert. |
| 2,585,106 | 2/1952 | Frank _____ 21—53 XR |
| 2,595,029 | 4/1952 | Wallace et al. _____ 21—53 XR |
| 2,899,722 | 8/1959 | Adams _____ 21—120 |
| 3,359,063 | 12/1967 | Maude _____ 21—107 XR |
| 1,341,525 | 5/1920 | Véricel _____ 239—43 |
| 1,818,684 | 8/1931 | Blechman _____ 239—44 XR |
| 1,838,221 | 12/1931 | Glover _____ 239—43 |
| 2,219,959 | 10/1940 | Laidley _____ 239—43 |
| 2,766,069 | 10/1956 | Tennyson _____ 239—43 |
| 2,991,517 | 7/1961 | Bundy. |

MORRIS O. WOLK, Primary Examiner

B. S. RICHMAN, Assistant Examiner

U.S. Cl. X.R.

21—74, 119, 120, 122; 219—274; 239—6, 37, 43, 44, 45, 49, 50